US008858657B1

(12) United States Patent
Deng et al.

(10) Patent No.: US 8,858,657 B1
(45) Date of Patent: Oct. 14, 2014

(54) DIRECT CONVERSION OF ALGAL BIOMASS TO BIOFUEL

(75) Inventors: Shuguang Deng, Las Cruces, NM (US); Prafulla D. Patil, Las Cruces, NM (US); Veera Gnaneswar Gude, Klamath Falls, OR (US)

(73) Assignee: Arrowhead Center, Inc., Las Cruces, NM (US)

( * ) Notice: Subject to any disclaimer, the term of this patent is extended or adjusted under 35 U.S.C. 154(b) by 413 days.

(21) Appl. No.: 13/333,479

(22) Filed: Dec. 21, 2011

Related U.S. Application Data

(60) Provisional application No. 61/426,333, filed on Dec. 22, 2010, provisional application No. 61/426,305, filed on Dec. 22, 2010.

(51) Int. Cl.
*C10L 1/18* (2006.01)

(52) U.S. Cl.
USPC .............................. 44/388; 554/124; 435/135

(58) Field of Classification Search
USPC .............................. 44/388; 554/124; 435/135
See application file for complete search history.

(56) References Cited

U.S. PATENT DOCUMENTS

| 5,939,571 | A | 8/1999 | Foidl |
| 6,187,939 | B1 | 2/2001 | Sasaki et al. |
| 6,288,251 | B1 | 9/2001 | Tsuto et al. |
| 6,570,030 | B2 | 5/2003 | Goto et al. |
| 7,518,092 | B2 | 4/2009 | Purta et al. |
| 7,524,982 | B2 | 4/2009 | Dall'Agnol et al. |
| 7,772,414 | B1 | 8/2010 | Hybertson et al. |
| 7,777,085 | B2 | 8/2010 | Berry et al. |
| 7,897,798 | B2 * | 3/2011 | McNeff et al. ................ 554/170 |
| 2006/0288636 | A1 | 12/2006 | Iijima et al. |
| 2008/0155888 | A1 | 7/2008 | Vick et al. |
| 2008/0188676 | A1 | 8/2008 | Anderson et al. |
| 2008/0196299 | A1 | 8/2008 | Anitescu et al. |
| 2008/0221344 | A1 | 9/2008 | Gleason et al. |
| 2008/0256845 | A1 | 10/2008 | Meikrantz |

(Continued)

FOREIGN PATENT DOCUMENTS

| BR | 200601246 A | 11/2007 |
| CN | 102559374 * | 7/2012 |
| GB | 2466493 A | 6/2010 |
| WO | WO-2009/149027 A2 | 12/2009 |

OTHER PUBLICATIONS

Patil, Prafulla D. et al., "Optimization of direct conversion of wet algae to biodiesel under supercritical methanol conditions", Bioresource Technology, vol. 102. Elsevier, Ltd., 2011, 118-122.

(Continued)

*Primary Examiner* — Cephia D Toomer
(74) *Attorney, Agent, or Firm* — Justin R. Jackson; Deborah A. Peacock; Peacock Myers, P.C.

(57) ABSTRACT

A method and system for providing direct conversion of algal biomass. Optionally, the method and system can be used to directly convert dry algal biomass to biodiesels under microwave irradiation by combining the reaction and combining steps. Alternatively, wet algae can be directly processed and converted to fatty acid methyl esters, which have the major components of biodiesels, by reacting with methanol at predetermined pressure and temperature ranges.

9 Claims, 20 Drawing Sheets

(56) References Cited

U.S. PATENT DOCUMENTS

| | | |
|---|---|---|
| 2008/0299643 A1 | 12/2008 | Howard et al. |
| 2009/0000941 A1 | 1/2009 | Kropf |
| 2009/0165367 A1 | 7/2009 | Wang et al. |
| 2009/0234146 A1 | 9/2009 | Cooney et al. |
| 2009/0264671 A1 | 10/2009 | Noh et al. |
| 2010/0089741 A1 | 4/2010 | Portnoff et al. |
| 2010/0151540 A1 | 6/2010 | Gordon et al. |
| 2010/0264015 A1 | 10/2010 | Portnoff et al. |
| 2010/0287823 A1 | 11/2010 | Misra et al. |

OTHER PUBLICATIONS

Patil, Prafulla D. et al., "Optimization of microwave-assisted transesterification of dry algal biomass using response surface methodology", Bioresource Technology, vol. 102, Elsevier, Ltd., 2011, 1399-1405.

\* cited by examiner

Prestep   B + ROH ⇌ RO⁻ + BH⁺
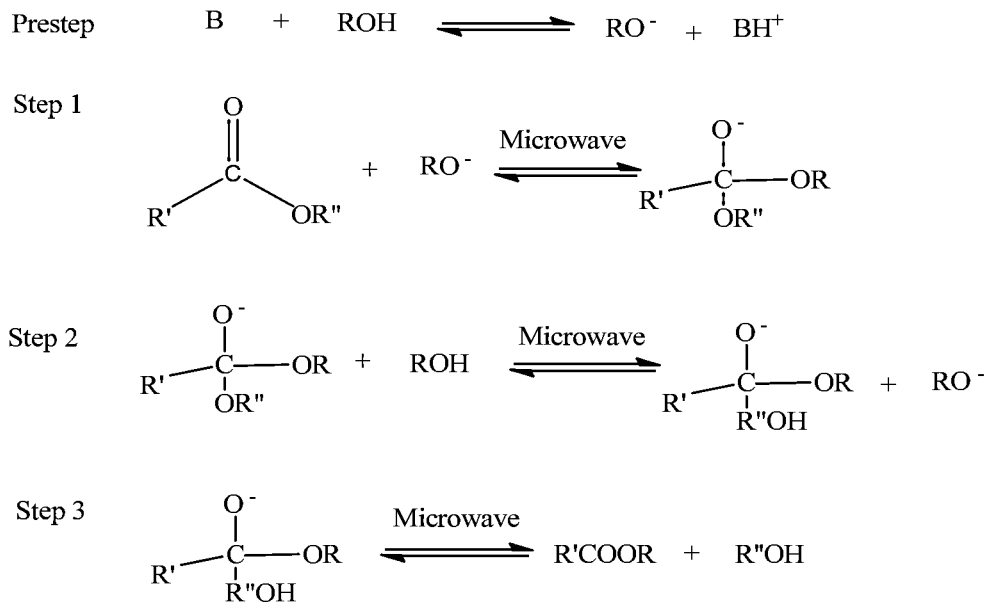
Where R" =
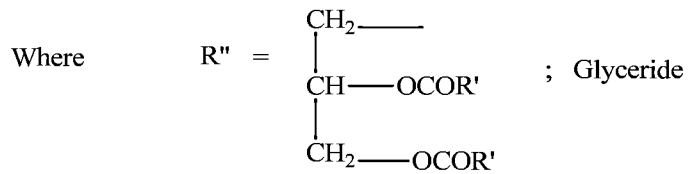
; Glyceride
R' = Carbon Chain of fatty acid
R = Alkyl group of alcohol
B = Base catalyst
FIG. 2

| Fatty acids | Common Name | Area (% total) |
|---|---|---|
| Tetradecanoic acid | Myristic acid, C14:0 | 3.13 |
| Hexadecanoic acid | Palmitic acid, C16:0 | 13.49 |
| Hexadecenoic acid | Palmitoleic acid,C16:1 n7 | 12.99 |
| Octadecanoic acid | Stearic acod, C18:0 | 2.53 |
| cis-9-Octadecanoic acid | Oleic acid ,C18:1 n9 | 37.52 |
| cis-9,12-Octadecadienoic acid | Linoleic acid, C18:2 n6 | 14.97 |
| cis-9,12,15-Octadecatrienoic acid | Alpha- Linolenic acid, C18:3 n3 | 0.58 |
| Eicosanoic acid | Arachidic acid, C20:0 | 1.03 |
| cis-11,14-Eicosandienoic acid | C20:2, n6 | 0.48 |
| cis-8,11,14-Eicosatrienoic acid | Dihomogammalinolenic acid, C20:3,n6 | 0.31 |
| cis-5,8,11,14-Eicosatetraenoic acid | Arachidonic acid, C20:4 n6 | 1.82 |
| cis-5,8,11,14,17-Eicosapentaenoic acid | EPA, C20:5 n3 | 10.38 |
| cis-15-tetracosenoic acid | Nervonic acid, C24:1 n-9 | 0.29 |
| 4,7,10,13,16,19-Docosahexanoic acid methyl ester | DHA, C20:6 n3 | 0.9 |
| Saturated fatty acids | | 20.18 |
| Unsaturated fatty acids | | 79.43 |
| Monounsaturated acids (MUFA's) | | 50.8 |
| Polyunsaturated acids (PUFA's) | | 28.63 |

FIG. 3

| Std Order | Run Order | Catalyst Conc. (wt %) | Methanol (wt/vol) | Time (min) | Observed FAME (%) | Predicted FAME (%) |
|---|---|---|---|---|---|---|
| 1 | 1 | 1 | 9 | 3 | 71.50 | 71.21 |
| 27 | 2 | 2 | 12 | 6 | 64.18 | 64.06 |
| 11 | 3 | 1 | 15 | 3 | 62.5 | 59.30 |
| 24 | 4 | 2 | 12 | 6 | 66.14 | 64.06 |
| 2 | 5 | 1 | 9 | 9 | 40.35 | 41.72 |
| 3 | 6 | 1 | 15 | 3 | 58.11 | 59.30 |
| 15 | 7 | 3 | 15 | 3 | 61.84 | 62.40 |
| 21 | 8 | 2 | 12 | 3 | 59.92 | 61.78 |
| 17 | 9 | 1 | 12 | 6 | 44.71 | 47.64 |
| 26 | 10 | 2 | 12 | 6 | 65.13 | 64.06 |
| 5 | 11 | 3 | 9 | 3 | 70.17 | 68.59 |
| 12 | 12 | 1 | 15 | 9 | 40.92 | 39.12 |
| 9 | 13 | 1 | 9 | 3 | 70.26 | 71.21 |
| 16 | 14 | 3 | 15 | 9 | 59 | 57.18 |
| 18 | 15 | 3 | 12 | 6 | 54 | 55.36 |
| 10 | 16 | 1 | 9 | 9 | 45.31 | 41.72 |
| 19 | 17 | 2 | 9 | 6 | 80.13 | 82.40 |
| 22 | 18 | 2 | 12 | 9 | 42 | 44.42 |
| 14 | 19 | 3 | 9 | 9 | 52.01 | 54.04 |
| 6 | 20 | 3 | 9 | 9 | 55.17 | 54.05 |
| 23 | 21 | 2 | 12 | 6 | 65.52 | 64.06 |
| 13 | 22 | 3 | 9 | 3 | 68.69 | 68.59 |
| 25 | 23 | 2 | 12 | 6 | 64.57 | 64.06 |
| 8 | 24 | 3 | 15 | 9 | 57.11 | 57.18 |
| 7 | 25 | 3 | 15 | 3 | 61.84 | 62.40 |
| 4 | 26 | 1 | 15 | 9 | 36.74 | 39.12 |
| 20 | 27 | 2 | 15 | 6 | 76 | 78.01 |
| 28 | 28 | 2 | 12 | 6 | 67.41 | 64.06 |

FIG. 5

| Source | DF | Seq SS | Adj SS | Adj MS | F | P |
|---|---|---|---|---|---|---|
| Model | 9 | 3370.4 | 3370.4 | 374.488 | 69.96 | 0 |
| Catalyst, Methanol, Time | 3 | 1710.44 | 1710.44 | 570.145 | 106.51 | 0 |
| Catalyst$^2$, Methanol$^2$, Time$^2$ | 3 | 1316.91 | 1316.91 | 438.971 | 82.01 | 0 |
| Catalyst*Methanol, Catalyst*Time, Methanol*Time | 3 | 343.05 | 343.05 | 114.349 | 21.36 | 0 |
| Residual error | 18 | 96.35 | 96.35 | 5.353 | | |
| Lack-of-Fit | 5 | 50.23 | 50.23 | 10.047 | 2.83 | 0.061 |
| Pure | 13 | 46.12 | 46.12 | 3.548 | | |
| Total | 27 | 3466.75 | | | | |

R-Sq = 97.22% , R-Sq(pred) = 92.53%, R-Sq(adj) = 95.83%
(DF- degree of freedom; Seq SS- sequential sum of squares; Adj SS- adjusted SS; Adj MS- adjusted mean of square; F- probability distribution; P- probability >F )

| Peak | Retention Time | Area (%) | Name |
|---|---|---|---|
| 1 | 3.796 | 1.28 | Oxirane,2-ethyl-2-methyl |
| 2 | 5.925 | 0.43 | Dodecane |
| 3 | 7.630 | 0.2 | tert-hexadecanethiol |
| 4 | 7.905 | 0.1 | Decanoic acid methyl ester |
| 5 | 8.563 | 0.73 | 8-heptadecene |
| 6 | 9.083 | 0.53 | Dodecanoic acid methyl ester |
| 7 | 9.226 | 0.09 | Cycloeicosane |
| 8 | 10.685 | 0.4 | Methyl myristoleate |
| 9 | 11.166 | 0.05 | Pentadecanoic acid methyl ester |
| 10 | 11.469 | 0.32 | cis-9-hexadecenoic acid |
| 11 | 12.122 | 13.49 | Hexadecanoic acid methyl ester |
| 12 | 12.471 | 12.99 | 9-hexadecenoic acid methyl ester |
| 13 | 12.745 | 0.25 | 9-12-octadecadienoyl chloride |
| 14 | 13.089 | 0.37 | Heptadecanoic acid methyl ester |
| 15 | 14.233 | 2.25 | Octadecanoic acid methyl ester |
| 16 | 14.365 | 0.05 | Diethyl phthalate |
| 17 | 14.708 | 37.52 | Cis-9-octadecenoic acid methyl ester |
| 18 | 15.109 | 14.97 | 9-12-octadecadienoic acid methyl ester |
| 19 | 15.212 | 0.8 | Benzophenone |
| 20 | 15.830 | 2.34 | Phytol |
| 21 | 16.751 | 3.65 | Methyl 18-methylnonadecanoate |
| 22 | 17.083 | 0.06 | cis-13-eicosenoic acid methyl ester |
| 23 | 17.706 | 0.36 | Tetradecanoic acid |
| 24 | 18.136 | 0.28 | Methyl 8,11,14-eicosatrienoate |
| 25 | 18.342 | 0.78 | 5,8,11,14-eicosatetraenoic acid methyl ester |
| 26 | 19.240 | 4.42 | cis-5,8,11,14,17-eicosapentaenoic acid methyl ester |
| 27 | 22.587 | 0.9 | 4,7,10,13,16,19-Docosahexanoic acid methyl ester |
| 28 | 25.362 | 0.1 | Hexadecanoic acid,tert-butyldimethylsilyl ester |

FIG. 9

| Run Order | Power, watt | % Cat | Algae/ MeOH | Time, min | FAME yield (% dry algae) |
|---|---|---|---|---|---|
| 1 | 1400 | 1 | 9 | 10 | 24.41 |
| 2 | 1400 | 1 | 15 | 4 | 24.39 |
| 3 | 700 | 3 | 9 | 4 | 24.12 |
| 4 | 700 | 1 | 15 | 4 | 19.06 |
| 5 | 1400 | 1 | 15 | 10 | 25.75 |
| 6 | 700 | 3 | 9 | 10 | 26.75 |
| 7 | 700 | 1 | 15 | 4 | 20.14 |
| 8 | 1400 | 3 | 15 | 4 | 29.29 |
| 9 | 1400 | 1 | 9 | 4 | 25.75 |
| 10 | 700 | 1 | 9 | 10 | 20.16 |
| 11 | 700 | 3 | 9 | 4 | 25.35 |
| 12 | 1400 | 3 | 15 | 4 | 34.04 |
| 13 | 700 | 3 | 15 | 4 | 29.56 |
| 14 | 1400 | 1 | 9 | 4 | 26.51 |
| 15 | 1400 | 1 | 15 | 10 | 26.33 |
| 16 | 700 | 3 | 15 | 4 | 25.26 |
| 17 | 1400 | 3 | 9 | 10 | 33.74 |
| 18 | 1400 | 1 | 9 | 10 | 24.78 |
| 19 | 700 | 1 | 9 | 4 | 18.56 |
| 20 | 1400 | 3 | 9 | 4 | 28.82 |
| 21 | 1400 | 3 | 15 | 10 | 39.78 |
| 22 | 1400 | 3 | 15 | 10 | 40.03 |
| 23 | 700 | 3 | 9 | 10 | 25.96 |
| 24 | 700 | 3 | 15 | 10 | 25.40 |
| 25 | 1400 | 3 | 9 | 4 | 27.90 |
| 26 | 700 | 1 | 9 | 10 | 22.08 |
| 27 | 700 | 1 | 15 | 10 | 20.09 |
| 28 | 1400 | 3 | 9 | 10 | 31.78 |
| 29 | 700 | 1 | 9 | 4 | 18.79 |
| 30 | 700 | 1 | 15 | 10 | 20.35 |
| 31 | 700 | 3 | 15 | 10 | 24.23 |
| 32 | 1400 | 1 | 15 | 4 | 21.61 |

Fig. 13

| Run Order | Std Order | Temperature (°C) | Methanol (wt/vol) | Reaction Time (min) | Observed FAME % | Predicted FAME % |
|---|---|---|---|---|---|---|
| 1 | 1 | 240 | 4 | 10 | 25.12 | 24.38 |
| 5 | 2 | | | | 20.15 | |
| 6 | 3 | 240 | 4 | 30 | 68.13 | 56.02 |
| 26 | 4 | | | | 53.15 | |
| 11 | 5 | 240 | 8 | 20 | 38.35 | 49.32 |
| 20 | 6 | 240 | 12 | 10 | 32.05 | 27.37 |
| 25 | 7 | | | | 28.15 | |
| 24 | 8 | 240 | 12 | 30 | 55.15 | 59.01 |
| 13 | 9 | | | | 62.62 | |
| 16 | 10 | 250 | 4 | 20 | 55.56 | 63.03 |
| 3 | 11 | 250 | 8 | 10 | 76.05 | 66.70 |
| 12 | 12 | | | | 82.15 | |
| 22 | 13 | | | | 77.20 | |
| 19 | 14 | 250 | 8 | 20 | 83.25 | 77.79 |
| 7 | 15 | | | | 79.15 | |
| 14 | 16 | | | | 78.15 | |
| 9 | 17 | | | | 76.07 | |
| 15 | 18 | 250 | 8 | 30 | 84.15 | 88.88 |
| 17 | 19 | 250 | 12 | 20 | 70.91 | 77.30 |
| 27 | 20 | 260 | 4 | 10 | 45.07 | 44.43 |
| 8 | 21 | | | | 39.31 | |
| 18 | 22 | 260 | 4 | 30 | 66.37 | 57.15 |
| 21 | 23 | | | | 54.12 | |
| 4 | 24 | 260 | 8 | 20 | 68.30 | 71.19 |
| 23 | 25 | 260 | 12 | 10 | 70.00 | 69.97 |
| 10 | 26 | | | | 72.35 | |
| 2 | 27 | 260 | 12 | 30 | 78.40 | 82.69 |
| 28 | 28 | | | | 85.75 | |

Fig. 14

| Term | Coef | SE Coef | T | P | Significant |
|---|---|---|---|---|---|
| Constant | 77.012 | 1.938 | 39.73 | 0 | Yes |
| Temp | 10.933 | 1.337 | 8.179 | 0 | Yes |
| Meth | 7.133 | 1.337 | 5.336 | 0 | Yes |
| Time | 11.088 | 1.337 | 8.295 | 0 | Yes |
| Temp*Temp | -20.213 | 3.38 | -5.981 | 0 | Yes |
| Meth*Meth | -10.303 | 3.38 | -3.048 | 0.007 | Yes |
| Time*Time | 6.562 | 3.38 | 1.942 | 0.068 | No |
| Temp*Meth | 5.638 | 1.418 | 3.977 | 0.001 | Yes |
| Temp*Time | -4.729 | 1.418 | -3.336 | 0.004 | Yes |
| Meth*Time | -2.047 | 1.418 | -1.444 | 0.166 | No |

$R^2 = 94.46\%$, R-Sq (pred) $= 84.35\%$, R-Sq (adj) $= 91.69\%$

Fig. 15

| Source | DF | Seq SS | Adj SS | Adj MS | F | P |
|---|---|---|---|---|---|---|
| Regression | 9 | 9870.7 | 9870.7 | 1096.74 | 34.1 | 0 |
| Linear | 3 | 5280.7 | 5280.7 | 1760.23 | 54.73 | 0 |
| Square | 3 | 3656.5 | 3656.5 | 1218.83 | 37.9 | 0 |
| Interaction | 3 | 933.5 | 933.5 | 311.17 | 9.67 | 0.001 |
| Residual Error | 18 | 578.9 | 578.9 | 32.16 | | |
| Lack-of-Fit | 5 | 257.6 | 257.6 | 51.51 | 2.08 | 0.133 |
| Pure Error | 13 | 321.4 | 321.4 | 24.72 | | |
| Total | 27 | 10449.6 | | | | |

Fig. 16

| Peak | Retention Time | Area (%) | Name |
| --- | --- | --- | --- |
| 1 | 3.264 | 0.63 | 2H-Pyran |
| 2 | 3.802 | 0.03 | Octanoic acid methyl ester |
| 3 | 4.609 | 0.01 | Nonanoic acid methyl etser |
| 4 | 4.905 | 0.2 | Dodecane |
| 5 | 5.250 | 0.1 | Benzenamine |
| 6 | 5.547 | 0.1 | Indole |
| 7 | 5.759 | 0.35 | Decanoic acid methyl ester |
| 8 | 6.354 | 0.18 | Naphthalene ,2,6-dimethyl |
| 9 | 7.933 | 0.05 | Cis-5-dodecenoic acid methyl ester |
| 10 | 8.305 | 3.14 | Undecanoic acid, 10-methyl ester |
| 11 | 9.524 | 19.72 | Tridecanoic acid methyl ester |
| 12 | 10.245 | 0.02 | 8-Heptadecene |
| 13 | 13.587 | 1.74 | 7-Hexadecenoic acid methyl ester |
| 14 | 13.632 | 4.5 | Cyclopropaneoctanal,2-octyl-9-Eicosyne |
| 15 | 14.125 | 0.2 | Cyclohexaneethanol |
| 16 | 15.124 | 7.34 | 9-Hexadecenoic acid methyl ester |
| 17 | 16.250 | 10.2 | Tricyclo decane |
| 18 | 16.923 | 9.92 | Pentadecanoic acid,13-methyl ester |
| 19 | 17.089 | 33.28 | 9-Octadecenoic acid methyl etser |
| 20 | 17.878 | 8.29 | Eicosanoic acid methyl ester |

Fig. 17

DIRECT CONVERSION OF ALGAL BIOMASS TO BIOFUEL

CROSS-REFERENCE TO RELATED APPLICATIONS

This application claims priority to and the benefit of the filing of U.S. Provisional Patent Application Ser. No. 61/426,333 entitled "Conversion of Wet Algae to Biodiesel", filed Dec. 22, 2010, and U.S. Provisional Patent Application Ser. No. 61/426,305, entitled "Microwave-Assisted Transestrification of Dry Algal Biomass", filed on Dec. 22, 2010, and the specifications thereof are incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. DE-EE0003046 awarded by the U.S. Department of Energy.

BACKGROUND OF THE INVENTION

1. Field of the Invention (Technical Field)

Embodiments of the present invention relate to a transesterification process that extracts oils from an algal biomass. Embodiments of the present invention also relate to a method and system for the direct liquefaction and conversion of wet algal biomass into biodiesel via a single-step supercritical alcohol process.

2. Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Microalgae, a third generation biofuel resource, has the potential to become a viable feedstock due to their high oil content and environmental-friendly nature. The major challenge, however, has been the high cost of recovering the oil from the microalgae prior to converting it into biodiesel. While there are many extraction methods such as solvent extraction, supercritical fluid extraction, ultrasonic extraction, and mechanical pressing; they require longer extraction times, large volumes of solvents, and are energy- and cost-intensive. Unlike vegetable oils from various crops that can be extracted by crushing the oil seeds followed by a solvent extraction, releasing oil from algal cells is hindered by a rigid cell wall structure. Thus, mechanical crushing seems to be an ineffective way to extract the oils from the algal biomass. In addition, using solvents for extraction may involve an expensive separation process. Microwave-assisted extraction or extractive transesterification is an alternative to address the above concerns as the ability of the microwaves to penetrate through the cell wall structure which results in an efficient recovery of oils and lipids.

Microwave irradiation has been used in the past to extract the oils from biomass, soils and vegetable feedstock. In microwave-assisted extraction, rapid generation of heat and pressure within a biological system forces out compounds from a biological matrix, producing good quality extracts with better target compound recovery. The rapid heating leads to localized high temperature and pressure gradients which assist in cellular wall degradation and enhanced mass transfer rates.

A process which provides simultaneous oil extraction and transesterification is worthwhile to develop. Aresta et al. conducted thermochemical liquefaction using wet algal biomass and supercritical CO2 extraction using dry algal biomass. Both of the processes seem to be energy intensive by the reaction conditions they reported (thermochemical liquefaction conditions: 250-395° C. for 1 hour and supercritical CO2 extraction conditions: 50° C., 2.60 MPa for 7 hours). A recent study has demonstrated the simultaneous extraction and transesterification (in-situ tranesterification) of the wet algal biomass in supercritical methanol conditions. In a microwave-assisted extraction and transesterification process, as it has been demonstrated in many organic and biodiesel synthesis studies, it is anticipated that the reaction can be conducted at atmospheric pressures and temperatures merely close to the boiling point of methanol with much shorter reaction time.

Biodiesel can also be produced from algal biomass and oils by extraction-transesterification, direct methanolysis and transesterification methods. Traditionally, algal biodiesel has been produced from wet algal biomass in a series of steps including preparation of dry algae powder, extraction of algal oils with chemical solvents, and conversion of the algal oil to biodiesel with a catalyst. Drying the biomass and extraction of algal oils by conventional methods are both energy and cost-intensive. An alternative to the conventional extraction and transesterification methods is supercritical process. Using water in wet algae as a tunable co-solvent in supercritical methanol process not only accelerates the conversion of fats and algal oils to fatty acid methyl esters (FAMEs), but also increases solubility and acidity.

There is a present need for a single-step supercritical process for simultaneous extraction and transesterification of wet algal biomass such that FAMEs can be produced from polar phospholipids, free fatty acids, and triglycerides by increasing fluidity and volatility while reducing the polarity of the high-energy molecules in algae at supercritical conditions. There is further a need for a supercritical process are that operates at modest temperatures and has a lower energy requirement compared to conventional extraction and transesterification methods.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention.

BRIEF SUMMARY OF THE INVENTION

One embodiment of the present invention comprises a method of converting algae biomass to biodiesel. This method preferably comprises mixing the algae biomass with a solution of alcohol and hydroxide catalyst and microwaving the mixture to extract oils from the algae biomass and converting the oils to biodiesel in a single step. The alcohol preferably comprises methanol and the hydroxide catalyst is preferably potassium hydroxide. This method can optionally comprise drying the algae biomass before the mixing step, preferably using a vacuum dryer. This method can also optionally comprise rupturing and/or grinding the algae biomass cells using a grinder or using liquid nitrogen. This method can also optionally comprise removing the alcohol from the biodiesel by evaporating the methanol in an evaporator and/or a vacuum distiller. The microwaving step takes approximately 1 to 20 minutes and comprises a simultaneous extraction and transesterification of the algae biomass.

Another embodiment of the present invention comprises a single-step method of converting wet algae biomass to biodiesel comprising reacting the wet algae biomass with a non-catalytic supercritical methanol, wherein the reaction results in the biodiesel. This method does not require a drying step and the reacting step is preferably performed at a constant predetermined pressure of about 1000 psi to about 1500 psi. The reacting step is also preferably performed at a constant temperature of about 200° C. to about 300° C. The wet algae biomass to methanol ratio is about 1:2 to about 1:20 (wt/vol.). A separate extraction step is not performed in this method of an embodiment of the present invention. The wet algae biomass is preferably reacted with a non-catalytic supercritical methanol in the presence of nitrogen. The reaction preferably takes approximately 5 to 45 minutes and comprises a simultaneous extraction and transesterification of the wet algae biomass.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 2 is a drawing which illustrates multiple step chemical process for a base catalyzed microwave transesterification reaction;

FIG. 3 is table which illustrates fatty acid composition (% as methyl esters) in the *Nannochloropsis* sp;

FIG. 5 is a table which illustrates experimental design based on RSM for direct transesterification of dry algal biomass;

FIG. 9 is a table which illustrates GC-MS peak and TIC data of crude biodiesel obtained from algal biomass;

FIG. 13 is a table which illustrates experimental results obtained for biodiesel yields at different microwave power dissipations;

FIG. 14 is a table illustrating results obtained from a experimental design based on response surface methodology (RSM) for direct transesterification of wet algal biomass;

FIG. 15 is a table which illustrates estimated regression coefficients for response from an analysis which was done using coded units;

FIG. 16 is a table which illustrates results obtained from a test of analysis of variance (ANOVA) for response;

FIG. 17 is a table which illustrates GC-MS peak TIC data of crude biodiesel obtained from algal biomass;

DETAILED DESCRIPTION OF THE INVENTION

As used herein, algal and algae are used interchangeably and refer to eukaryotic (complex-celled) photosynthetic organisms.

An embodiment of the present invention comprises a method of microwave irradiation for simultaneous extraction of oils/lipids and transesterification (in-situ transesterification) of dry algal biomass to biodiesel. The method comprises an efficient process for direct conversion of dry algae to biodiesels under microwave irradiation. Dry algae is directly processed and converted to fatty acid methyl esters by reacting the algae with an alcohol, preferably, methanol mixed with a hydroxide, preferably, potassium hydroxide under microwave irradiation for less than approximately 10 minutes, and preferably approximately 1-9 minutes and more preferably approximately 3-9 minutes. The products from the reaction have major components of biodiesels. The product of biodiesels from dry algae is achieved by combining extraction and conversion steps, which reduces the costs of biodiesel. The biodiesel can then be reformed to produce jet fuels for aviation and other high value products.

Figures 6, 7A, 7B:
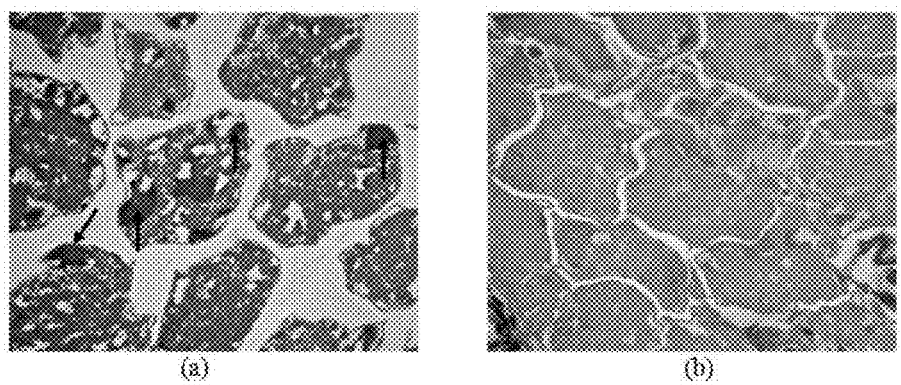
FIG. 6 is a table which illustrates analysis of variance (ANOVA) for response surface quadratic model for the fatty acid methyl ester FAME content.
FIGS. 7A and 7B are electron microscopy illustrations showing areas of thin sections from dry algae sample (a) and microwave processed sample (b). Many cell profiles in (a) include electron-dense inclusions representing lipid (arrows), but after microwave processing, cell profiles do not contain electron-dense inclusions. Scale bar is one micrometer.
Figure 8A:
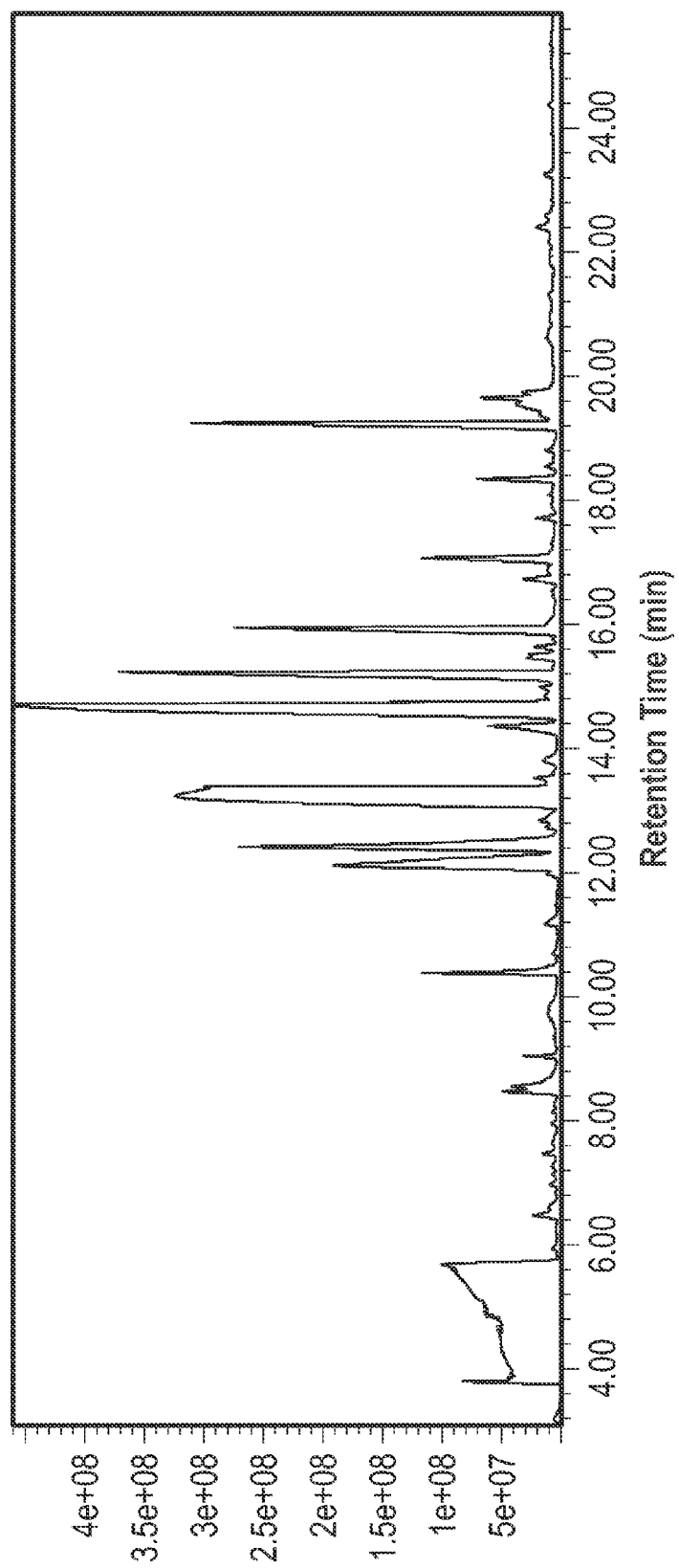
FIGS. 8A-8D are (A) GC Chromatogram obtained for algal biodiesel; mass spectrums of PUFA methyl esters: (B) Eicosapentaenoic acid methyl ester [C20:5], (C) Docosahexanoic acid methyl ester [C20:6], (D) Arachidonic acid methyl ester [C20:4]
Figure 8B:
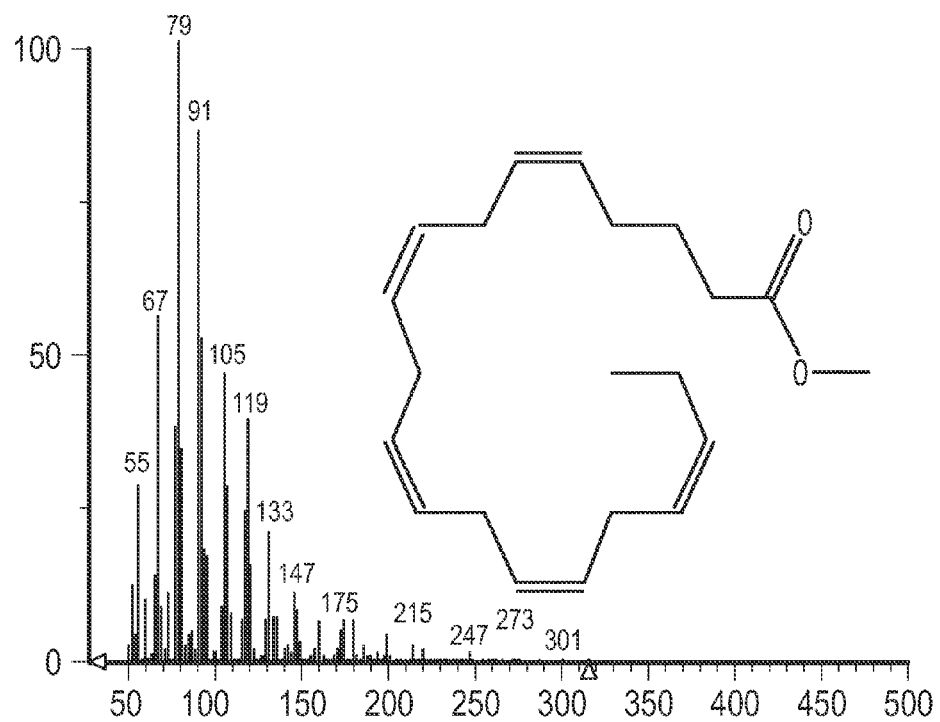
Figure 8C:
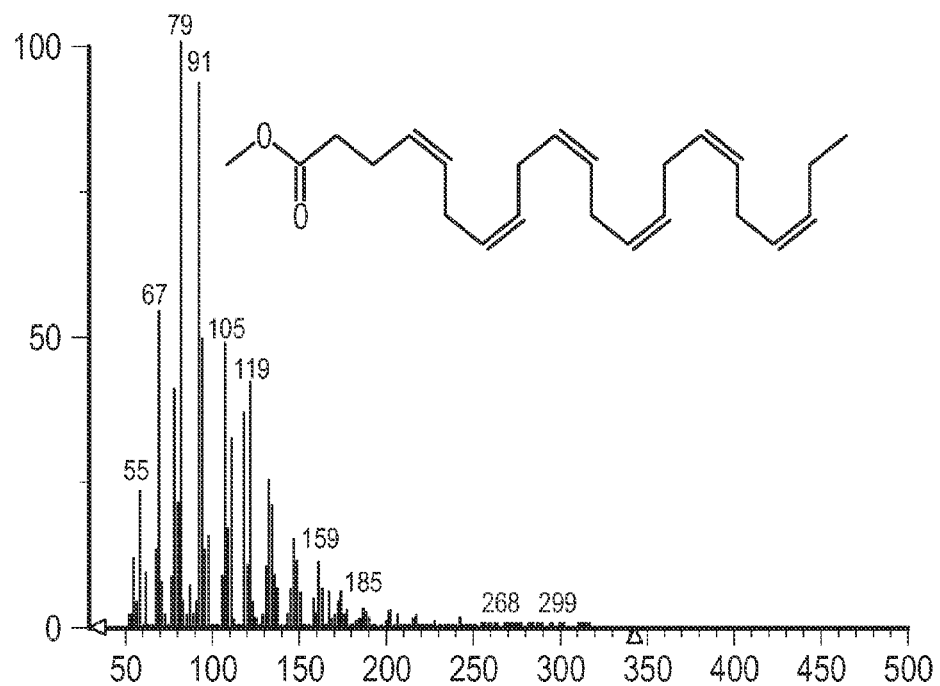
Figure 8D:
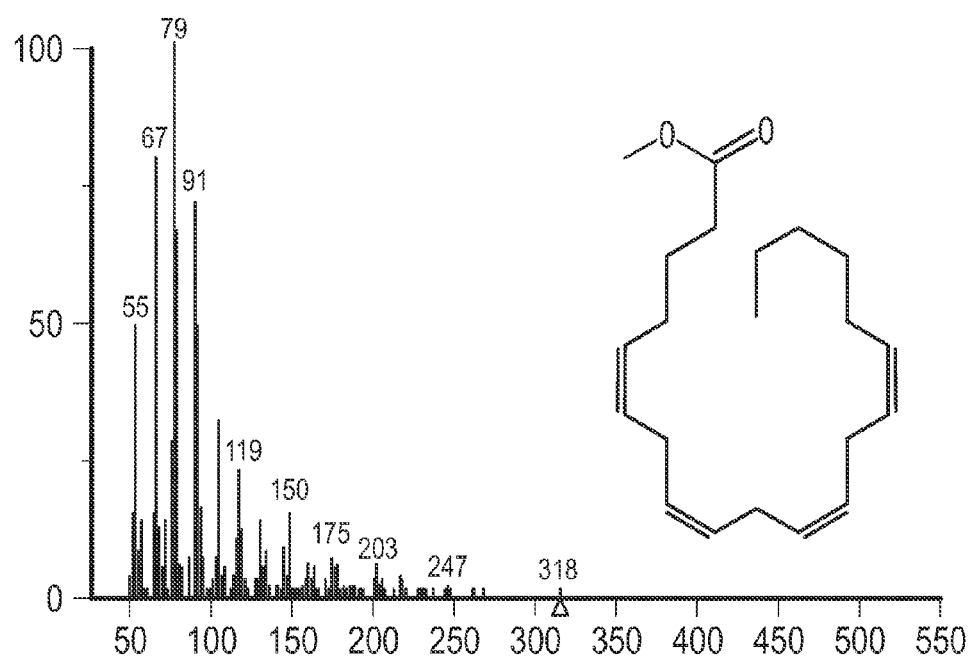

Embodiments of the present invention result in a high degree of oil/lipid extraction from dry algal biomass and an efficient conversion of the oils/lipids to biodiesel. A response surface methodology (RSM) was used to analyze the influence of the process variables (dry algae to methanol (wt/vol) ratio, catalyst concentration, and reaction time) on the fatty acid methyl ester conversion. Based on the experimental results and RSM analysis, the optimal conditions were determined for this process. The algal biodiesel samples were analyzed with GC-MS and thin layer chromatography (TLC) methods. Transmission electron microscopy (TEM) images of the algal biomass samples before and after the extraction/transesterification reaction are illustrated in FIGS. 7A and 7B.

Figure 1:
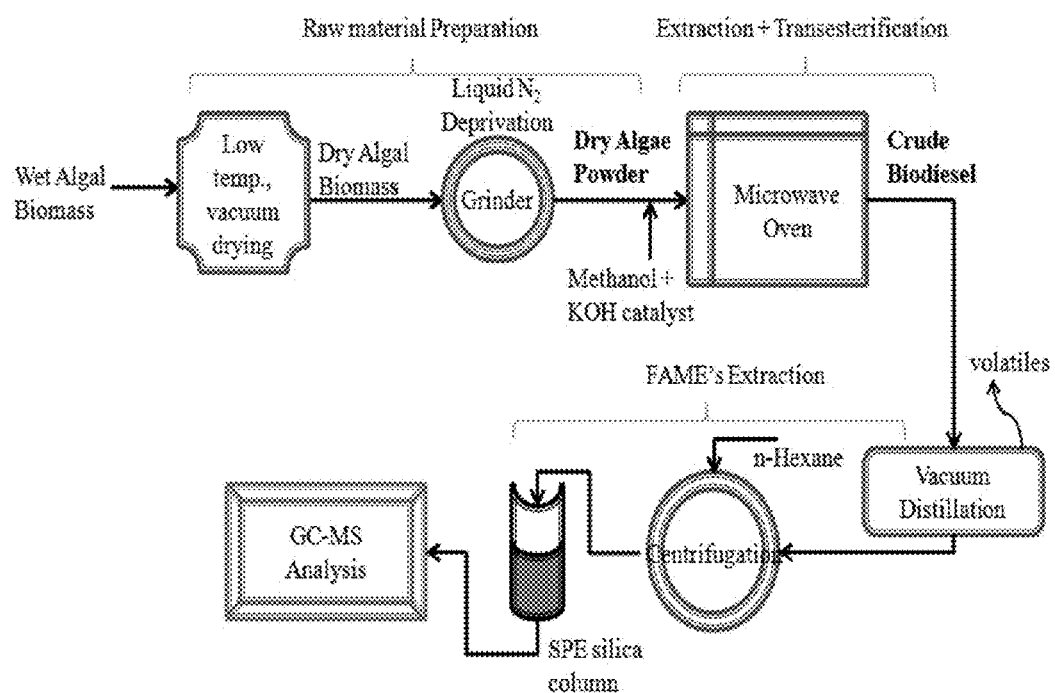
FIG. 1 is a drawing which schematically illustrates a process for single-step microwave transesterification process for dry algal biodiesel.

Embodiments of the present invention comprise a single-step extractive transesterification process that can extract the oils from a dry algal biomass and simultaneously convert them into algal biodiesel under microwave irradiation. Ultrasonic energy input is not required in this embodiment of the present invention. An example of the process is illustrated in FIG. 1. A method of the present invention preferably comprises drying a wet algal biomass, preferably in a low temperature vacuum dryer or oven. The dry algal cells in the biomass are then ruptured and/or broken using liquid nitrogen and a grinder. The dry algal biomass is then ground down to a powder and mixed with a solution of alcohol, preferably methanol and a hydroxide, preferably potassium hydroxide. The dry algae to methanol ratio is preferably between about 1:5 and about 1:15 and more preferably about 1:12 (wt/vol.). The potassium hydroxide has a concentration of about 1% (wt) to about 5% (wt) and preferably a concentration of about 2% (wt). The mixture is then microwaved, preferably for approximately one to approximately 15 minutes. The reaction temperature is preferably about 50° C. to about 75° C. and more preferably between about 60° C. and 65° C. The microwaving extracts oils from the dry biomass and converts them into an algal biomass. After microwaving the mixture, the methanol and any other volatiles are removed, preferably with an evaporator or vacuum distiller. The remaining biodiesel is placed in a centrifuge with hexane and centrifuged for about 1 to about 20 minutes, preferably about 1 to about 10 minutes and more preferably about 5 minutes.

One embodiment of the present invention preferably achieves a high degree of oil/lipid removal from the dry algal biomass and an efficient conversion of oils/lipids to biodiesel. Reaction time is preferably reduced and the solvent volume is reduced as compared with the separate lipid extraction and transesterification processes. A response surface methodology technique was applied to optimize the effect of the catalyst concentration, dry algae to methanol ratio, and reaction time. Results obtained from the RSM optimization study, GC-MS analysis, TLC analysis, and TEM analysis of raw material and final residue of the process are presented in the following examples.

The mechanism of base-catalyzed microwave transesterification is described in FIG. 2. The first step involves the attack of the alkoxide ion to the carbonyl carbon of the triglyceride molecule which results in the formation of a tetrahedral intermediate. The reaction of this intermediate with an alcohol produces the alkoxide ion in the second step. In the last step, the rearrangement of the tetrahedral intermediate gives rise to an ester and a diglyceride. In a similar way, diglyceride is transesterified to form methyl ester and monoglyceride, which is converted further to a biodiesel, preferably methyl ester and glycerol, in the last step.

Microwave effect on the transesterification reaction preferably: 1) enhances the reaction by a thermal effect, and 2) evaporates methanol (or any other alcohol) due to the strong microwave interaction of the material. The microwave interaction with the reaction compounds, preferably triglycerides and methanol, results in a large reduction of activation energy due to increased dipolar polarization phenomenon. This is achieved due to molecular level interaction of the microwaves in the reaction mixture resulting in dipolar rotation and ionic conduction. The amount by which the activation energy is reduced is essentially dependent on the medium and reaction mechanism. Methanol is a strong microwave absorption material and in general, the presence of an OH group attached to a large molecule behaves as though it were anchored to an immobile raft and the more localized rotations dominate the microwave spectrum and result in localized superheating which assists the reaction to complete faster.

One embodiment of the present invention also provides a one-step process for direct liquefaction and conversion of wet algal biomass to biodiesel under supercritical alcohol conditions, preferably super critical methanol conditions. The wet algal biomass preferably comprises about 90% water. This one-step process enables simultaneous extraction and transesterification of wet algal biomass. The process conditions of this embodiment are milder than those required for pyrolysis and prevent the formation of by-products. Embodiments of the present invention eliminate the algae drying step and combines extraction with conversion.

One method of converting algal biomass to biodiesel comprises the steps of subjecting algae, preferably wet algae, to a non-catalytic supercritical alcohol, preferably methanol, in a reactor, under controlled conditions. The reactor preferably does not contain a porous structure. The conditions are preferably a constant pressure of approximately 1000 psi to approximately 1500 psi and preferably about 1200 psi; reaction times of about 5 minutes to about 45 minutes and preferably between about 10 minutes to about 30 minutes; reaction temperatures of about 200° C. to about 300° C. and preferably between about 240° C. and 260° C. The wet algae to methanol ratio (wt/vol) was about 1:2 to about 1:20 and preferably between about 1:4 to 1:12. In this embodiment of the present invention, ultrasonic energy is not required to convert algal biomass to biodiesel. There is no ultrasonic energy used in this embodiment of the present invention.

In embodiments of the present invention, fatty acid methyl esters (FAMEs) can be produced from polar phospholipids, free fatty acids, and/or triglycerides. A response surface methodology (RSM) was used to analyze the influence of the three process variables, namely, the wet algae-to-methanol (wt/vol) ratio, the reaction temperature, and the reaction time, on the FAMEs conversion. Algal biodiesel samples were analyzed by ATR-FTIR and GC-MS. A preferred embodiment of the present invention comprises a process which operates with a wet algae to methanol (wt/vol) ratio of about 1:1 to 1:20, more preferably about 1:5 to 1:10 and most preferably about 1:9, a reaction temperature of about 200° C.-300° C., more preferably about 225° C.-275° C. and most preferably about 255° C. and time of about 0-60 minutes, more preferably about 10-40 minutes, and most preferably about 25 minutes. In this preferred embodiment, the pressure is preferably constant at about 900-1500 psi, more preferably 1100-1300 psi and most preferably 1200 psi. Embodiments of the present invention provide a single-step process that is energy efficient and economical system for algal biodiesel production.

The cost of biodiesel production from vegetable oils through supercritical process is estimated to be about $0.26/gal which is about half of that of the conventional transesterification methods, $0.51/gal. This may very well be applied to algal oils as the algal biomass contains much higher levels of unsaturated fatty acids, lipids, and triglycerides. Embodiments of the present invention provide a method and system for the direct liquefaction and conversion of wet algal biomass into biodiesel via a single-step supercritical methanol process in the presence of nitrogen, while providing process parameters which are uniquely suited to influence the super critical transesterification reaction using response surface methodology (RSM). Embodiments of the present invention preferably produce biofuels from wet algae by eliminating both algae drying and extraction steps, which reduces the cost of biodiesel.

INDUSTRIAL APPLICABILITY

The invention is further illustrated by the following non-limiting examples.

Example 1

Materials and Methods

Algal paste from outdoor raceway ponds (Inoculum *Nannochloropsis* sp. (CCMP1776)) was received from the Center of Excellence for Hazardous Materials Management (CE-HMM) in Artesia, N. Mex. and was vacuum dried for about 24 hours at a temperature around 50-60° C. Silica gel TLC plates and spray reagent kit were obtained from Analtech, Newark. Potassium hydroxide (KOH) flakes were procured from Acros Organics, New Jersey.

A domestic microwave oven with exiting power of about 800 W was modified and fitted with a temperature reader and a water-cooled reflux condenser. An external agitator was included to ensure uniform mixing of the reaction mixture. A ceramic stand to hold the sample vessel in the direction of microwave source was placed inside the microwave reactor. Microwave-transparent, three-neck round bottomed reaction vessels made of borosilicate glass were used as sample vessels. Average of test results obtained for three repetitive tests were analyzed to evaluate the reproducibility of microwave effect. After each test, the microwave reactor was allowed to cool and return to original conditions with adequate cooling and reaction interval.

Example 2

Characteristics of *Nannochloropsis* Algal Species

Qualitative elemental analysis of crude algal biomass was determined by scanning electron microscopy (SEM, HITACHI S-3400 N) equipped with energy-dispersive X-ray spectroscopy (EDS). The major elements and their approximate composition in (wt %) were Carbon (63.18), Oxygen (28.16%), Sodium (0.54%), Magnesium (0.36%), Silicon (0.75%), Phosphorous (0.22%), Chlorine (0.26%), and Potassium (0.60%), Calcium (0.39%), Sulfur (0.36%). It is important to note that the elemental composition for *Nannochloropsis* sp. is dependent on various harvesting conditions, cultivation periods and isolation methods.

The fatty acid composition (% as methyl esters) in the algal lipid is shown in FIG. 3. The crude algae lipid contains a major proportion of esters of mono and polyunsaturated fatty acids. The ratio of saturated fatty acids to unsaturated fatty acids was calculated as 20.18/79.43=0.254. One possible method to increase the economical feasibility of microalgal biofuel production is to coproduce high value products along with the biofuels. Some of the high value bio-products that can be extracted from *Nannochloropsis* microalgae are phycobiliproteins carotenoids (e.g. indole, oxalic acid, diethyl phthalate, naphthalene); polyunsaturated fatty acids (e.g. EPA, DHA, arachidonic acid); and vitamins (e.g. ascorbic acid).

Example 3

Experimental Procedures

The single-step microwave-assisted extraction and transesterification method for dry algal biomass is illustrated in FIG. 1. Wet algal biomass (frozen biomass in 50 mL falcon tubes stored at about −80° C.) was allowed to dry in a laboratory vacuum oven at 50-60° C. for approximately 24 hours. Dry algal powder was obtained by breaking the individual algal biomass cells with Liquid $N_2$ and rupturing it in the laboratory grinder. Two grams of dry algae powder was added to the premixed homogeneous solution of methanol and KOH catalyst.

The mixture was then subjected to the microwave irradiation with exiting power of about 800W (Power Dissipation level of 50%=400 W) (however power of about 800W is not required) under a matrix of conditions: reaction times of about 1-15 minutes, and preferably 3, 6, and 9 minutes; catalyst concentrations in the range of 1-3 wt % of dry biomass; and dry algae to methanol (wt/vol) ratios of 1:9 to 1:15. The reflux condenser played an important role to condense, return and maintain the solvent volume in the reaction mixture throughout the experiments. An external agitator (TALBOYS Laboratory Stirrer; Model 101, 40 Watts) was included to ensure uniform mixing with mixing speed set at 1000 rpm constant for all the experiments.

After the reaction was completed, the reactor contents were transferred into a 50 mL round-bottom flask and freed of methanol and volatiles at a reduced pressure in a rotary evaporator. The remaining products were taken in hexane and then centrifuged (3200 rpm) for approximately 5 minutes. The upper organic layer containing non-polar lipids was extracted and run through a short column of silica (Hyper SPE Silica). Neutral components were eluted with the solvent. An internal standard, methyl heptadecanoate (C17:0) was added quantitatively to the eluted neutral component-solvent solution and analyzed by gas chromatography-mass spectroscopy (GC-MS).

Example 4

Statistical Analysis of Experimental Design

Figure 4A:
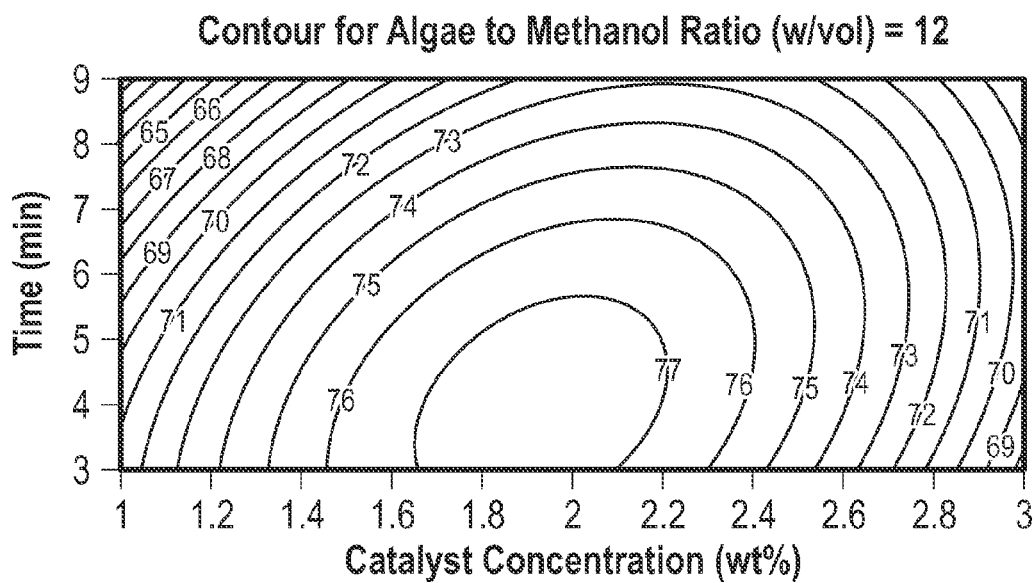
FIGS. 4A-4C are contour maps illustrating the effect of algae to methanol ratio (wt/vol) and catalyst concentration (wt %) on the fatty acid methyl ester (FAME) content using RSM for times of 10, 20, and 30 minutes.
Figure 4B:
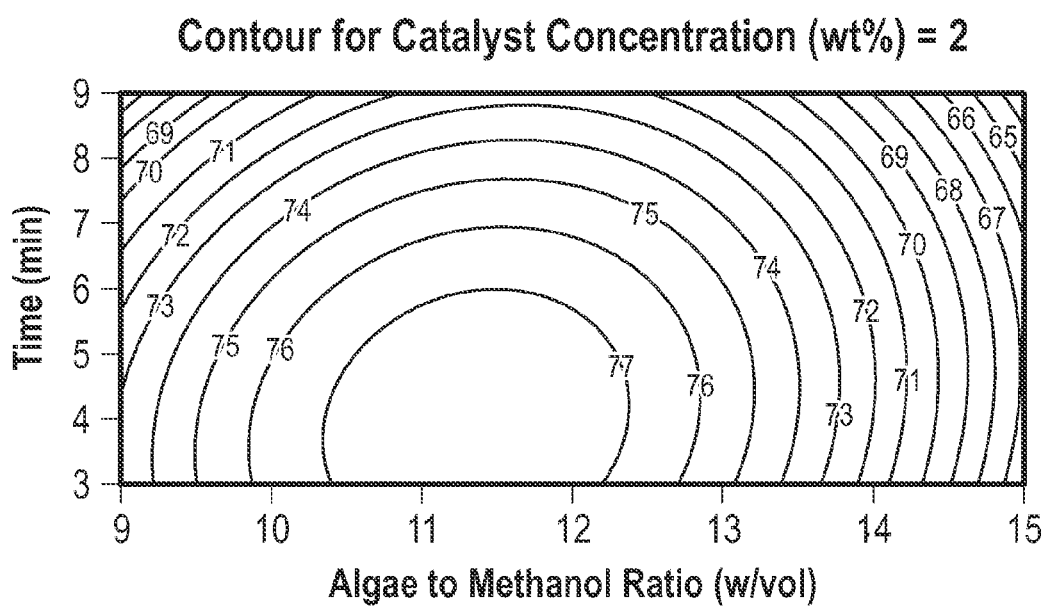
Figure 4C:
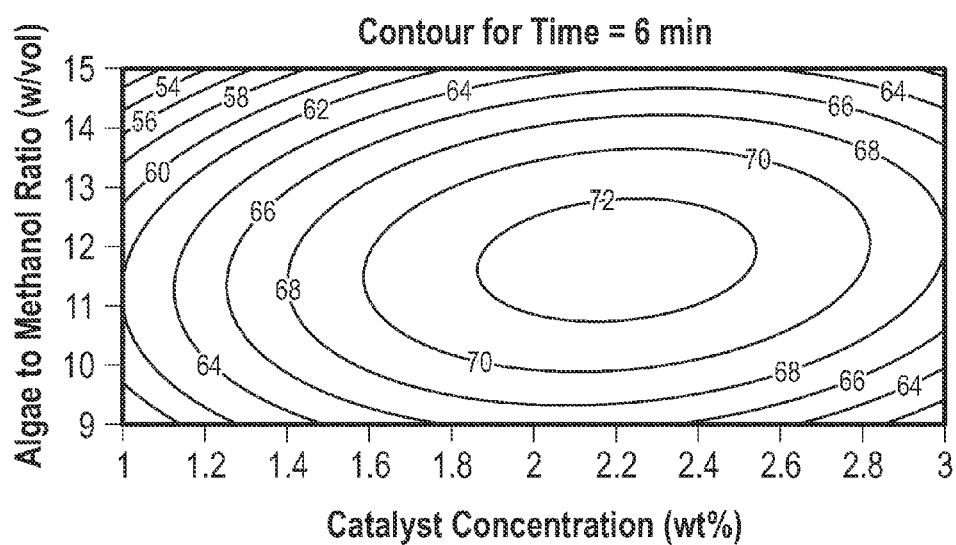

The effect of the three factors and their interactions were studied using a response surface methodology as shown in FIG. 4A-4C. Based on experience and economic feasibility, a three factorial subset design was employed. The total number of experimental runs was 28 with replications as shown in FIG. 5. The dry algae to methanol ratios (wt/vol), catalyst concentration, and reaction times were varied in the ranges of 1:9-1:15, 1-3%, and 3-9 minutes respectively.

The following equation is a general linear model used in the analysis:

$$\mu = \beta_0 + \sum_{i=1}^{3} \beta_i x_i + \sum_{i=1}^{3} \beta_{ii} x_i^2 + \sum_{i=1}^{2} \sum_{j=i+1}^{3} \beta_{ij} x_i x_j \quad (1)$$

Where x1, x2 and x3 are the levels of the factors and µ is the predicted response if the process were to follow the model. The detailed statistical analysis of experiment design is presented elsewhere.

Three contours were obtained to include the variation of response for each of the factors with the remaining factors. The holding values of all the factors are the corresponding center levels. For algae to methanol weight ratio of about 12, the optimal region of operation would be a catalyst concentration of about 2 wt % with the reaction time slightly greater than 4 minutes. Similarly for a catalyst concentration of 2%, the optimum region of interest would be algae to methanol ratio of about 12 and the reaction time around 4. Contours 1 and 2 provide the same information with one acting as a proof of optimality for the other. The third contour with a holding value of 6 minutes yields responses that are lower than the ones obtained above. This is a proof that at reaction times slightly greater than 4 minutes the fatty acid methyl ester (FAME) value starts to decrease.

To summarize the analysis, it would be safe to consider the operation at the following conditions: algae to methanol weight ratio slightly less than 12, catalyst concentration around 2% and the reaction times slightly greater than 4 minutes. A residual analysis was also carried to verify the assessment of the model assumptions, namely evaluation of all the important effects, normality distribution of noise or error generated by the experiment and the experimenter (random noise) and to verify if the errors have the same variance. Based on the residual analysis and the lack of fit analysis of variance (ANOVA), we can conclude that the optimal region suggested is in fact statistically significant.

Example 5

Development of Regression Model

Analysis of variance (ANOVA) for response surface quadratic model for the FAME content is shown in FIG. 6. The regression analysis indicates that all the three parameters had significant influence on the fatty acid methyl ester content, which was confirmed by the P-values of the analysis. The response surfaces were fitted using process variables that were found to be significant after the analysis. The P-value of the lack of fit analysis was 0.061, which is more than the 0.05 (Confidence level is 95%). The regression model provided accurate description of the experimental data indicating successful correlation among the three transesterification process parameters that affect the yield of algal biodiesel. This was further supported by the value of the correlation coefficient, R2 (0.972).

Effects of Process Parameters and Optimization

FIGS. 4A-4C shows the response contours of the effect of different combinations of process parameters namely algae to methanol (wt/vol) ratio, catalyst concentration expressed as wt % of dry algae, and reaction time (min) on the FAME content. The effect of methanol on the simultaneous extraction and transesterification reaction is significant with increasing dry algae to methanol ratios up to 1:12 (wt/vol). In this reaction, methanol acts both as a solvent for extraction of the algal oils/lipids (Mulbry et al., 2009) as well as the reactant for tranesterification of esters. Methanol is a good microwave radiation absorption material. Its dipole quickly reorientates under the microwave irradiation, which destroys the two-tier structure of the interface of methanol and oil extracted from the dry algae. Therefore, the solubility of methanol and algal oil is improved under microwave irradiation, to the advantage of the transesterification reaction. Higher ratio of biomass to methanol could shift the reversible reaction forward (as observed) perhaps due to increased contact area between methanol and oil/lipid, resulting in higher yield of FAME. However, higher dry algae to methanol ratios (above 1:12(wt/vol)) may not favor the extraction and transesterification as much of the microwave irradiation will be absorbed by the solvent, not affecting the dry algae which could result in inefficient extraction of algal oils.

Higher volumes of methanol may also result in greater losses of the solvent or aggravated rates of solvent recovery. In a previous study, wet algae to methanol (wt./vol.) ratios had a positive effect on the yield up to about 1:9 but had a negative impact at higher levels at supercritical methanol (SCM) conditions. Also, excessive methanol amounts may reduce the concentration of the catalyst in the reactant mixture and retard the transesterification reaction. From practical point of view, it is beneficial to keep the methanol levels as low as possible to reduce the downstream separation costs. Too low quantities of methanol are not suitable for the reaction as methanol is used in the reaction both as a solvent and a reactant. Hence, sufficient amount of methanol ratio is required to further drive the transesterification reaction which is determined to be about 1:12 (wt/vol).

From the counter plot for catalyst concentration effect on FAME yield shown in FIG. 4A-4C, catalyst concentrations up to 2% (wt) show a positive effect on the transeseterification reaction. As this is two-phase reaction mixture, the oil/lipid concentration in the methanol phase is low at the start of the reaction leading to mass transfer limitations. As the reaction proceeds, the concentration of oil/lipid in the methanol phase increases, leading to higher transesterification rates with increasing catalyst concentrations. The homogeneous, solvent-catalyst methoxide prepared using potassium hydroxide is more susceptible to microwave irradiation as compared to solid catalysts and yield high biodiesel conversion rates. Lower concentration of the catalyst may not efficiently advance the reaction as the catalyst effect is hindered by the presence of variety of organic compounds (lipids, olefins, fatty alcohols, phytols, sterols) resulted from algal biomass extraction. However, higher concentrations of catalyst above 2% (wt) did not show any positive effect on the biodiesel conversion. This may be due to the interaction of the other compounds resulting in byproducts. Other disadvantages of high basic catalyst concentrations, in general, are their corrosive nature and tendency to form soap which hinders the transesterification reaction. Microwave-assisted reactions may eliminate the need for the catalyst in the reaction, however, at the expense of high reaction temperatures and pressures, larger volumes of solvents and longer reaction times.

The reaction time has significant effect on the FAME content. Generally, extended reaction times provide for enhanced exposure of microwaves to the reaction mixture which result in better yields of extraction and biodiesel conversion. Lower reaction times do not provide sufficient interaction of the reactant mixture as the microwave effect is two fold in the extraction and tranesterification reaction. Thermal effect caused by the microwaves increases the extractive properties of methanol to extract the oils from the algal biomass in suspension (diffusive extraction) and extended microwave effect causes the penetration through the cell walls and forces out the oils into the solvent mixture (disruptive extraction). The reaction time of about 1-5 minutes, and preferably about 4-5 minutes, is adequate for the complete extraction and tranesterfication reaction under microwave irradiation. Higher reaction times above 5 minutes are inefficient as they may result in overheating of the reaction mixture, greater losses of solvent, by-product formation and energy losses.

From the above analysis, it was concluded that the optimum process conditions for microwave assisted simultaneous extraction and transesterification reaction are: dry algae to methanol ratio of 1:12 (wt/vol), KOH concentration of about 2% (wt) and the reaction time of about 4-5 minutes at a reaction temperature around 60-64° C.

The microwave assisted extractive-transesterification method reduces the chemical and energy requirements and longer reaction, extraction, settling times when compared to conventional method with separate solvent extraction and catalytic transesterification steps. Conventional methanol with hexane and ether mixture as solvent requires 24 hours for extraction of algal oils, 3 hours of mixing and shaking (for transesterification) and 16 hours of settling for separation. The supercritical methanol process requires critical conditions such as high temperature and pressure indicating the energy intensity of the process (reaction temperature of 255° C., 1200 psi for 25 minutes). However, the process eliminates the need for catalyst in transesterification and subsequent product purification step. On the other hand, microwave-assisted extractive transesterification process is effective with minimal amounts of solvents and can be a non-catalytic process at supercritical conditions as reported by other researchers. This is possible with microwave-assisted extraction method due to its ability to heat the reaction mixture more rapidly than the conventional method.

Example 6

TEM Analysis of Algal Biomass

Dry, unprocessed ('raw') algal samples and residual material following microwave processing were collected and ground into a powder for subsequent analysis by electron microscopy. Thin sections of the embedded powders were cut with a diamond knife and stained with solutions of 2% uranyl acetate and lead citrate, then the ultrastructure was visualized using a model H-7650 transmission electron microscope (Hitachi High-technologies, Pleasanton, Calif.) in the bright field imaging mode. Digital images were acquired with an integrated CCD camera system (AMT Corp., Danvers, Mass.).

The dried-rehydrated, unprocessed algal powder contained particles composed almost entirely of close-packed, roughly spherical algal cells, approximately 1-2 micrometers in diameter. The ultrastructural components in the previously dried cells were difficult to identify with accuracy, but as many as three or four irregularly-shaped, electron-dense inclusions, as large as 0.5 micrometers wide, were frequently found within single thin sections of individual cells (see FIG. 7A) and in some fields of view, over half the cell profiles contained one or more similar electron-dense inclusions in the cytoplasm.

Comparable views of powder particles in thin sections of the residue from microwave processing contained intact, very close-packed cell profiles with homogeneous and moderate electron-dense cytoplasmic contents but no large electron dense inclusions comparable to the unprocessed algal samples (See FIG. 7B).

Imidazole-buffered osmium tetroxide solution was employed as a stain for visualizing lipids by electron microscopy. In rehydrated algal powder particles, many cells contained large electron-dense inclusions that were not found in cells of the residue following microwave heating. This probably indicates that the electron-dense inclusions contain algal cell lipids, and they were extracted during microwave heating by a process that leaves the other organelles and algal cells intact and therefore more easily separated from the extracted lipids.

Example 7

Analysis of Algal Biodiesel

GC-MS Analysis

For the quantification of reaction product, the algal biodiesel samples were analyzed by a gas chromatography-mass spectrometry (GC-MS) system incorporated with an Agilent 5975 C MSD and an Agilent 7890 A GC equipped with a capillary column (DB-23, 60 m×250 µm×0.15 µm nominal). Methyl heptadecanoate (10.00 mg; internal standard) was dissolved in 1 mL heptane to prepare the standard solution. The content of the fatty acid methyl ester in the final product was calculated quantitatively by comparing the peak areas of fatty acid methyl esters to the peak area of the internal standard (methyl heptadecanoate, C17:0) obtained from GC-MS analysis.

From the GC chromatogram of algal biodiesel shown in FIG. 8, it can be noted that algal biodiesel contains a major proportion of mono and poly unsaturated fatty acid methyl esters. From the GC-MS peak and total ion chromatography (TIC) data, it was observed that the algal biodiesel contains olefins, fatty alcohols, sterols and vitamins in minor quantities along with saturated and unsaturated FAMEs. The relative weight compositions of organic compounds present in the algal biodiesel was analyzed using GC-MS, as shown in FIG. 9. Polyunsaturated fatty acids (PUFAs) methyl esters (Arachidonic acid; C20:4, EPA; C20:5, DHA; C20:6) typically found in *Nannochloropsis* microalgae obtained using GC/MSD (NIST library). These PUFAs found in microalgal oils differentiate them from most other vegetable oils.

TLC Analysis

Figures 10A, 10B:
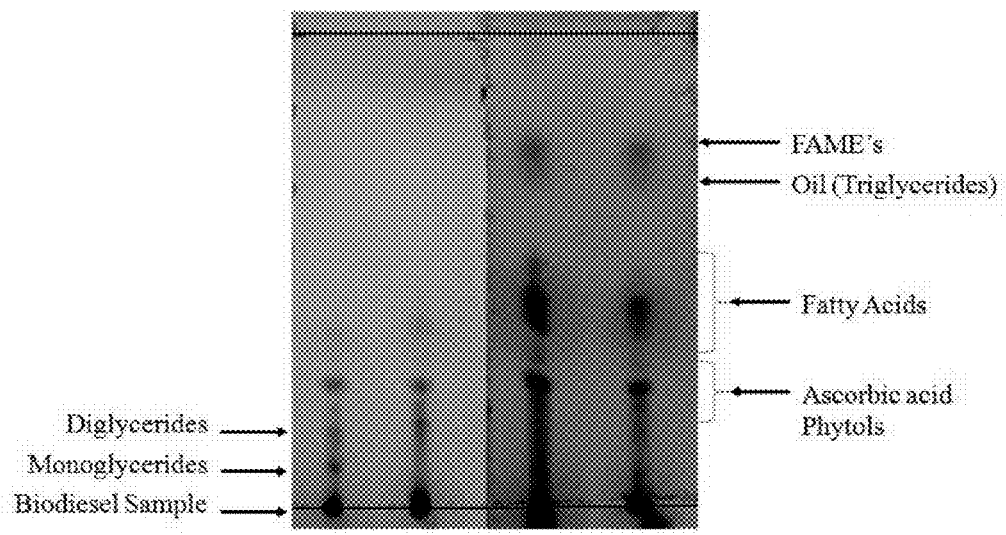
FIGS. 10A and B are TLC chromatograms of algal biodiesel samples (a) initial development of the TLC plate; (b) Silica-gel plate showing the position of methyl esters, triglycerides and fatty acids found in *Nannochloropsis* algal sp.

Thin Layer Chromatography (TLC) was performed on 250-µm Silica gel GF plates (Scored 10×20 cm, 250 Microns). The developing solvent was hexane/diethyl ether/acetic acid (80:20:1, by vol). Spots were visualized by spraying with 50% aqueous sulfuric acid solution and charring on a hotplate for 10 min at 150° C. in an air circulating vent hood. The TLC analysis results are shown in FIGS. 10A and 10B.

TLC presents the results for silica-gel plate showing the position of methyl esters, triglycerides, fatty acids, ascorbic acid (vitamin), and phytol found in *Nannochloropsis* algal sp. It was observed from TLC plates for experiments 8 and 9. As the products are less concentrated (dissolved in the solvent), the spots which are less dark and larger in size, indicate 50 to 60% of FAME yield. The retention factor for methyl ester and triglycerides was calculated as $Rf,ME=4/6.2=0.645$ and $Rf,TG=3.5/6.2=0.564$, respectively. The compound with the larger Rf is less polar because it interacts less strongly with the polar adsorbent on the TLC plate. Here, methyl esters and triglycerides exhibit high non-polarity characteristics.

Example 8

A Microwave-Assisted In-Situ Transesterification Reaction

Experimental Protocol

Figure 11:
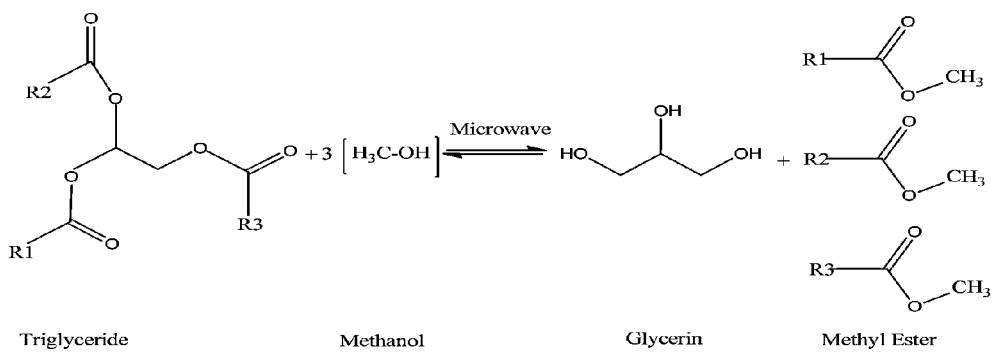
FIG. 11 is a drawing illustrating a chemical reaction using microwave-assisted transesterification according to an embodiment of the present invention.

The microwave-assisted transesterification reaction of algal biomass is illustrated in FIG. 11. Two grams of dry algae powder (*Nannochloropsis* sp.) were added to the premixed homogeneous solution of methanol and KOH catalyst.

Figure 12:
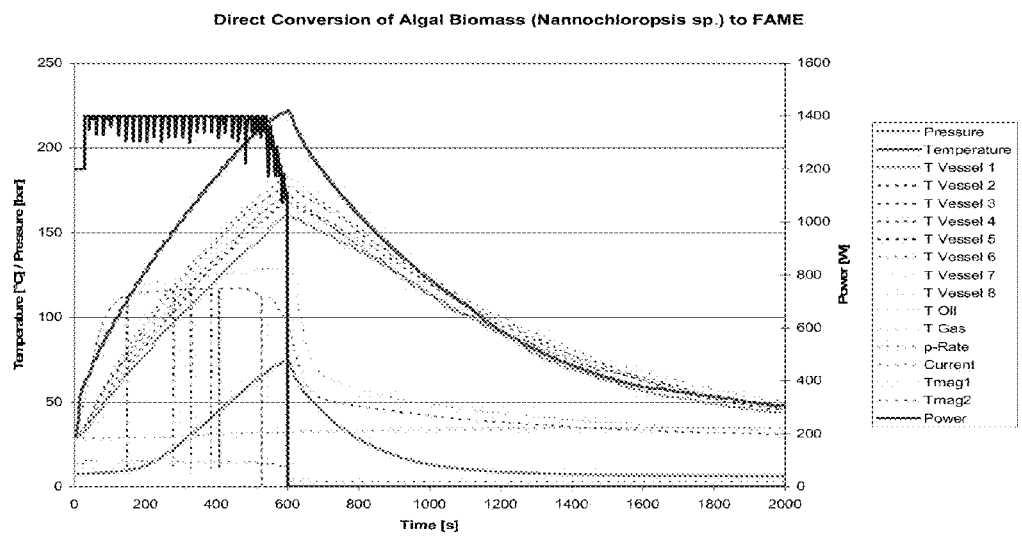
FIG. 12 is a graph which illustrates the relationship of temperature and pressure versus time during direct conversion of algal biomass according to an embodiment of the present invention.

The mixture was then subjected to the microwave irradiation (Microwave Synthos 3000) with exiting power of about 1400W under a matrix of conditions: reaction times of about 4 and 10 min; catalyst concentrations in the range of about 1-3 wt. % of dry biomass; and dry algae to methanol (wt/vol) ratios of about 1:9-1:15. After the reaction was completed, the reactor contents were transferred into a 50 mL round-bottom flask and freed of methanol and volatiles at a reduced pressure in a rotary evaporator. The remaining products were dissolved in hexane-water to induce biphasic layer and then centrifuged (3200 rpm) for about 10 min. The upper organic layer (top dark green) containing non-polar lipids was extracted and run through a short column of silica (Hyper SPE Silica). Neutral components eluted with the solvent were concentrated in vacuum oven and analyzed with gas chromatography-mass spectroscopy (GC-MS) and FT-IR. The real-time analysis of direct conversion of dry algal biomass to biodiesel under microwave power controlled study is illustrated in FIG. 12.

The following Table 2 illustrates the power settings, times and fan speeds that were used in this experiment:

TABLE 2

| Step | Power, Watt | Ramp | Hold | Fan |
|---|---|---|---|---|
| 1, Heating | 1400 | 0 min | 10 min | 1 |
| 2, Cooling | 0 | | 10 min | 3 |

Total Reaction time=10 min, p-rate:2 bar/s,IR:280 C,P:80 bar, Drive:Rot, Stirrer:3
Process Maxima: 74.6 bar, 222° C.

Experimental Design and Results

The effect of the four factors (Power dissipation, Catalyst, algae/methanol, time) and their interactions were studied for the power controlled microwave transesterification reaction of algal biomass using the response surface methodology. The initial results based on these experiments are represented in Table 2. It was observed that the maximum biodiesel yield (% of dry biomass) of 40.03% was obtained at the following reaction conditions: 1400 watt, about 3% catalyst concentration, about 1:15 (algae/methanol) ratio and about 10 min. reaction time. Another test was conducted to control the power dissipation during the transesterification reaction to know the effect of five (5) different levels of power dissipation on biodiesel yield (Table 1). The results suggest that proper power dissipation control will result in effective use of the microwave energy and further reduction in energy requirements.

The following Table 2 illustrates biodiesel yield for different power dissipations:

TABLE 2

| Power dissipated (J/s) | 200 | 400 | 800 | 1000 | 1400 |
|---|---|---|---|---|---|
| Biodiesel yield (% of dry biomass ) | 6.75 | 14.68 | 17.34 | 23.09 | 40.03 |

FIG. 13 is a table which summarizes the results obtained from various runs of the experiment using varying microwave
Conclusion:

Microwave-assisted extraction and transesterification of dry algal biomass was demonstrated for optimum reaction conditions using a response surface methodology. The in-situ transesterification process proved to be fast and easy method to produce biodiesel from dry algal biomass. The single-step extractive transesterification process provides energy efficient and economical route for algal biodiesel production.

Example 9

Algal paste (*Inoculum Nannochloropsis* sp. (CCMP1776)); methyl heptadecanoate (C17), standard for (for GC-MS analysis); extra pure (99%) methanol; hexane; acetic acid; and sulfuric acid were obtained. For the purification of crude algae FAME, SPE Silica columns were also obtained. The supercritical methanol process was carried out in the PARR 4593 Micro-reactor with a 4843-controller. Transmission electron microscopy (TEM) of frozen and residue (after SCM) algal biomass was examined with an electron microscope, operated in the bright field mode.

The ash-free dry weight of the algae sample and lipid yield on dry weight basis were found to be about 69.8% and 50%, respectively. Lipid extraction report for *Nannochloropsis* sp. has the following composition: triglycerides: 37.74%; other non-polar hydrocarbons, isoprenoids: 8.72% and polars, glycolipids, phospholipids: 3.54%. The gross estimation of non-polar hydrocarbons and triglycerides was determined using thin layer chromatography (TLC) and densitometry technique. Previous work by other researchers showed that total fatty acids accounted for 30-50% of dry biomass, depending on different culture conditions. Qualitative elemental analysis of crude algal biomass was determined by scanning electron microscopy equipped with energy-dispersive X-ray spectroscopy (EDS). The major elements and their approximate composition (wt %) were carbon (72%), oxygen (21%), sodium (1.5%), magnesium (0.41%), silicon (0.93%), phosphorous (0.47%), chlorine (1.52%), potassium (0.96%).

The FTIR spectra of the *Nannochloropsis* algal species show the same general features indicating (i) the highly aliphatic character of the residues revealed by the strong absorption at 720 cm-1 (ii) the presence of hydroxyl groups characterized by the absorption centered at 3400 cm-1, and (iii) the presence of carboxyl groups characterized by the absorption band at 1710 cm-1 (iv) and the presence of carbonyl groups indicated by the absorption band at about 1735 cm-1.

The biosynthesis route of triglycerides in microalgae is believed to include the following three steps: (a) the formation of acetyl coenzyme A (acetyl-coA) in the cytoplasm; (b) the elongation and desaturation of the carbon chain of fatty acids; and (c) the biosynthesis of triglycerides. Similar to other higher plants and animals, microalgae are able to biosynthesize triglycerides to store biomass and energy. L-α-phosphoglycerol and acetyl-coA are believed useful for the biosynthesis of triglycerides.

In the supercritical state, depending on pressure and temperature, the intermolecular hydrogen bonding in the methanol molecule will be significantly decreased. As a result, the polarity and dielectric constant of methanol are reduced allowing it to act as a free monomer. Subsequently, methanol at supercritical conditions can solvate the non-polar triglycerides to form a single phase of lipid/methanol mixture and yield fatty acid methyl esters and diglycerides. In a similar way, diglyceride is transesterified to form methyl ester and monoglyceride, which is converted further to methyl ester and glycerol in the last step.

Important variables in the proposed process affecting the FAME content of the product are the wet algae to methanol (or other alcohol) (wt/vol) ratio, the reaction temperature, and the reaction time. A response surface methodology (RSM) was used to analyze the influence of these three process variables on the fatty acid methyl esters (FAMEs) content. Based on experience and economic feasibility, a three factorial subset design was employed. The design contained three levels on three factors that could be represented by a cube with six replications at the center. The six replications at the center offer better approximation of the true error which statistically helps in determining significance of the variables. Another advantage of this method is its symmetry in design with regard to the center, which offers equal importance to all levels of all parameters. The total number of experimental runs was 28 with replications as illustrated in the table of FIG. 4. The wet algae to methanol ratios (wt/vol), reaction times, and reaction temperatures were varied in the ranges of approximately 1:4-1:12, approximately 10-30 min, and approximately 240-260° C., respectively. The lower temperature limit, 240° C., was just above the critical temperature of methanol and the upper temperature limit, 260° C., was determined by the decomposition temperature limit of algal biomass (based on several trial runs).

A general second order linear model with the deconstructionist approach was employed for its flexibility and ease of parametric evaluation for the predicted response surface. Statistically insignificant terms were excluded from the proposed design based on design hierarchy for the construction of the response surface. Also, the interaction terms considered manifests a better estimation on the combination effect of any two parameters considered. Linear least square method was used to predict the values of parameters involved. The confidence level of the statistical analysis conducted was 95%.

The experimental protocol for one-step supercritical methanol process is as follows: from the aliquots prepared previously (frozen biomass in 50 mL falcon tubes at −80° C.), 4 grams of wet algae paste (~10% solids) was subjected to a non-catalytic supercritical methanol (SCM) process in a 100 mL PARR micro-reactor under a matrix of conditions: constant pressure of 1200 psi; reaction times of about 10, 20, and 30 minutes; reaction temperatures of about 240, 250, and 260° C.; and wet algae to methanol (wt/vol) ratios of about 1:4, 1:8, and 1:12. After the reaction was completed, the reactor contents were transferred into a 50 mL round-bottom flask and freed of methanol and volatiles at a reduced pressure in a rotary evaporator. The remaining products were taken in hexane and then centrifuged (3200 rpm) for about 5 minutes. The upper organic layer containing non-polar lipids was extracted and run through a short column of silica (Hyper SPE Silica). Neutral components were eluted with the solvent. For qualitative analysis, an internal standard, methyl heptadecanoate (C17:0) was added quantitatively to the eluted neutral component-solvent solution and analyzed by gas chromatography-mass spectroscopy (GC-MS). The content of the fatty acid methyl ester in the final product was calculated quantitatively by comparing the peak areas of fatty acid methyl esters to the peak area of the internal standard (methyl heptadecanoate, C17:0) obtained from GC-MS.

A general linear model which accounts for the single parameters' linear and quadratic effects with their interaction effects was considered. The following is the general linear model for our analysis:

$$\mu = \beta_0 + \sum_{i=1}^{3} \beta_i x_i + \sum_{i=1}^{3} \beta_{ii} x_i^2 + \sum_{i=1}^{2} \sum_{j=i+1}^{3} \beta_{ij} x_i x_j$$

where, x1, x2 and x3 are the levels of the factors and p is the predicted response if the process were to follow the model. A deconstructionist approach was followed which indicates the consideration of a complete quadratic model and eliminating terms which were not significant as the analysis continued. All further analysis was carried out using both coded and uncoded variables. Method of least squares was employed to ascertain the values of the model parameters and ANOVA to establish their statistical significance at a confidence level of 95% (in our case).

The central composite design (CCD) matrix and the response obtained from the experimental runs are illustrated in the table of FIG. 14. The estimated regression coefficients for response and analysis of variance (ANOVA) for response are illustrated in the tables of FIGS. 15 and 16 respectively.

The regression analysis indicated that all three parameters had significant influence on the fatty acid methyl ester content, which was confirmed by the P-values. The response surfaces were fitted using process variables that were found to be significant after the analysis. The P-value of the lack of fit analysis was found to be 0.133, which is more than the 0.05 (confidence level is 95%). The regression model provided accurate description of the experimental data indicating successful correlation among the three transesterification process parameters that affect the yield of algal biodiesel. This is further supported by the correlation coefficient, R2 of 0.921.

Figure 18A:
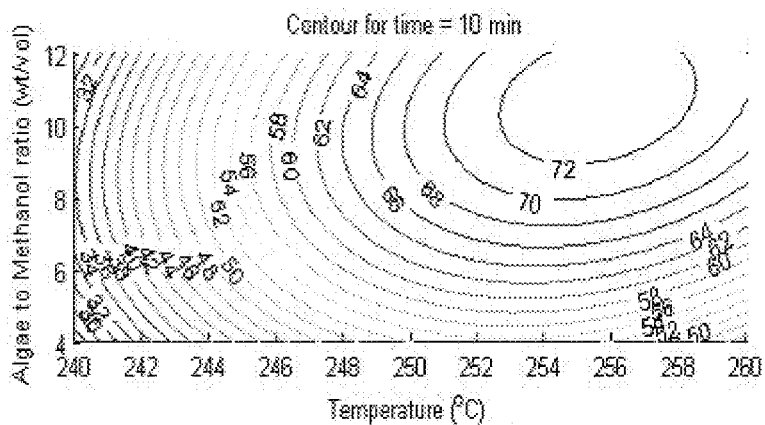
FIGS. 18A-C respectively illustrate contour maps illustrating yield against reaction temperature and wet algae wt/methanol volume ratio at reaction times of about 10, 20, and 30 minutes, using RSM.
Figure 18B:
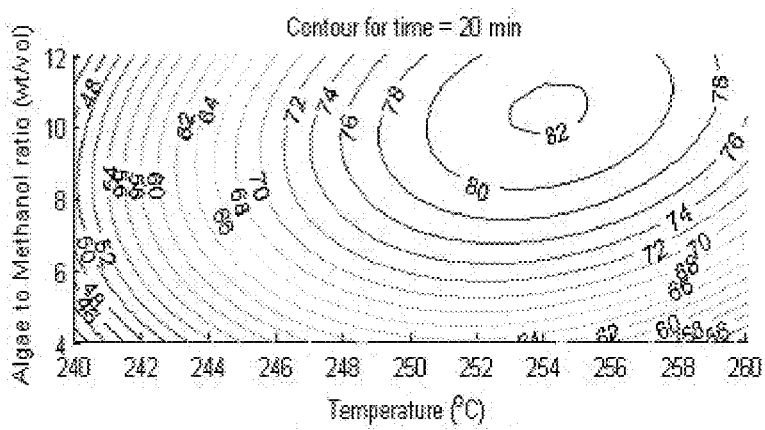
Figure 18C:
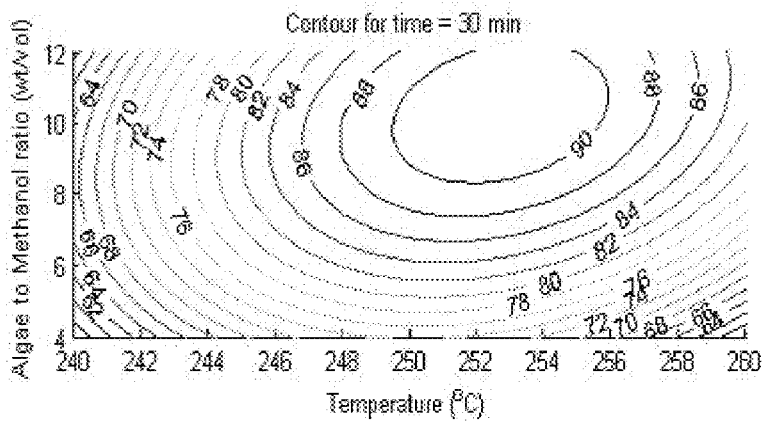

FIGS. 18A-C illustrate the response contours of FAME yield against reaction temperature and wet algae to methanol (wt/vol) ratio at three different reaction time intervals and fixed reaction pressure of about 1200 psi. The values and signs on the regression coefficients suggested that the reaction time affects the response positively for temperatures up to 255° C.; however, reaction temperatures above 255° C. were not suitable for transesterification reaction of the algal biomass at fixed pressure of 1200 psi. This may be due to the fact that the oil/lipid and the alkyl esters tend to decompose or become thermally unstable above the specified temperature owing to the high content of unsaturated fatty acids. It was observed that at high temperature and pressure, unsaturated fatty acids tend to decompose due to the isomerization of the double bond functional group from cis-type carbon bonding (C=C) into trans-type carbon bonding (C=C), which are naturally unstable fatty acids. The FT-IR spectrum (reaction temperature of 270° C.) showed a trans-type carbon bonding (C=C) group at the wavelength of 960 cm-1 which is absent at this wavelength for the reaction temperature of 250° C. The greater the percentage of unsaturation in fatty acids or esters of algal biomass, the more it is susceptible to oxidation. The extent of unsaturation of in esters can be reduced easily by partial catalytic hydrogenation of the oil.

Wet algae to methanol (wt/vol) ratios were found to have a positive effect on the yield up to 1:9 but to also have a negative impact at higher levels. Higher ratio of biomass to methanol may shift the reversible reaction forward (as observed) perhaps due to increased contact area between methanol and lipid, resulting in higher yield of FAME and it also contributed to the lower critical temperature of the mixture. However, its interaction with reaction temperature can, on the other hand, cause a reduction in the yield of FAME due to either the decomposition of FAME or the critical temperature of the reactant/product mixture between methanol and FAMEs, which become highly dependent on the concentration of methanol and may decrease the critical temperature of the reactant/product. When reactant/product mixture is heated above critical temperature, it has the tendency to decompose.

As expected, a longer reaction time allows the transesterification reaction to proceed to completion and results in a higher yield of FAMEs from algal biomass. Previous studies have indicated that higher reaction time beyond a particular limit in supercritical alcohol process for vegetable oil may lead to greater losses of unsaturated FAME due to degradation reactions. Nevertheless, FIGS. 18A-C illustrate that the effect of reaction time is more prominent at wet algae to methanol (wt/vol) ratio of 1:9 and reaction temperature around 255° C. at a fixed reaction pressure of 1200 psi. In water added supercritical methanol reaction, the water-methanol mixture has both strong hydrophilic and hydrophobic properties that help to speed up the reaction significantly. Based on the experimental analysis and RSM study, the optimal conditions for this process are reported as: wet algae/methanol (wt/vol) ratio of around 1:9, reaction temperature and time of about 255° C., and 25 minutes respectively.

For analysis of elemental composition, raw and residual samples were washed with distilled water and centrifuged pellets were excised from centrifuge tubes, air-dried and glued to carbon adhesive tabs on aluminum sample stubs.

Elemental spectra were collected at 15 kV using a scanning electron microscope equipped with an energy dispersive spectrometer system.

From TEM analysis report of frozen (raw) and residual algal biomass, it was found that at SCM condition, algal cell wall structure was totally disturbed and fragmented while EDS report showed the evidence for thermal degradation of algal biomass (wt % of 'C' increased in residue) due to high content of unsaturated fatty acids in lipid.

For the quantification of reaction product, the algal biodiesel samples were analyzed by a gas chromatography-mass spectrometry (GC-MS) system incorporated with a MSD and a GC. The content of the fatty acid methyl ester in the final product was calculated quantitatively by comparing the peak areas of fatty acid methyl esters to the peak area of the internal standard (methyl heptadecanoate, C17:0) obtained from GC-MS. It is noted from GC-MS results that algal biodiesel contained a major proportion of mono and poly unsaturated fatty acid methyl esters. The major fatty acids were palmitoleic acid (C16:1, 30-33%), oleic acid (C18:1, 35-38%), eicosapentanoic acid (EPA, C20:5n3, 5-8%), palmitic acid (C16:0, 5-10%,) and arachidonic acid (C20:4n6, 1-3%). From the GC-MS peak and total ion chromatography (TIC) data, it was observed that the algal biodiesel contained olefins, fatty alcohols and sterols in minor quantities along with saturated and unsaturated FAMEs. The relative weight compositions of organic compounds present in the algal biodiesel was analyzed using GC-MS, as illustrated in the table of FIG. 17.

Figure 19:
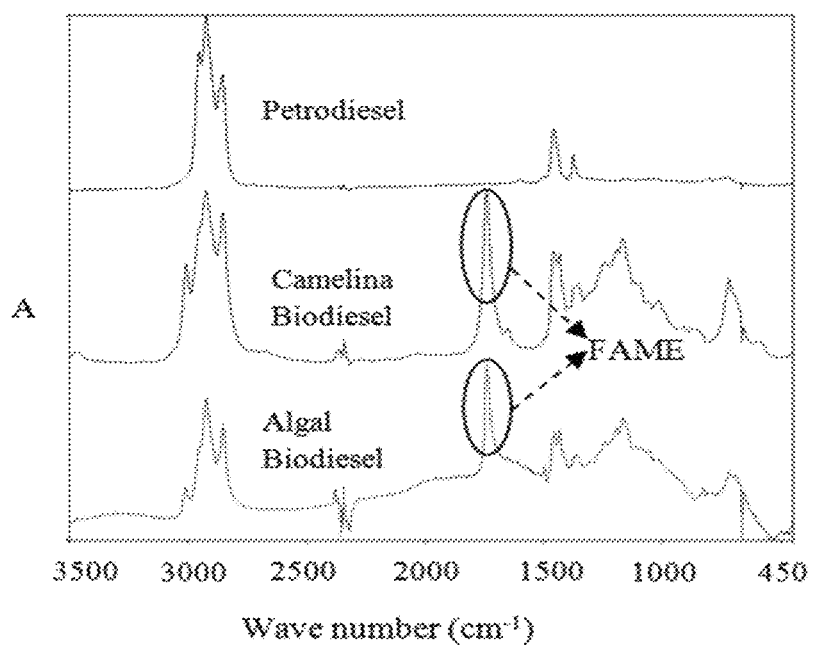
FIG. 19 is chart which illustrates FTIR results of algal biodiesel, petro-diesel, and camelina biodiesel.

ATR-FTIR spectra of petro-diesel, camelina biodiesel, and algal biodiesel are shown in FIG. 19. The IR spectra were obtained using a spectrometer. The main components of diesel are aliphatic hydrocarbons, whose chemical structures are similar to long carbon chain of the main components of biodiesel. The observation of absorption Peaks around 1200 cm-1 may be assigned to the antisymmetric axial stretching vibrations of CC(=O)—O bonds of the ester, while peaks around 1183 cm-1 may be assigned to asymmetric axial stretching vibrations of O—C—C bonds. In addition, since biodiesel is mainly mono-alkyl ester, the intense C=O stretching band of methyl ester appears at 1743 cm-1 for algal and camelina biodiesel which is absent in petro-diesel spectra.

The single-step process for wet algal biomass offers the benefits of shorter reaction time, simple purification of products and maximum conversion of triglycerides into their corresponding fatty acid methyl esters. The single-step process favors the energy requirements for biodiesel production by eliminating the needs for drying and extraction of algal biomass. Process optimization using response surface methodology (RSM) design proved to be a valuable tool for evaluating the effects of the process variables on the FAMEs yield. The single-step process has the potential to provide an energy efficient and economical route to algal biodiesel production.

The preceding examples can be repeated with similar success by substituting the generically or specifically described components and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above and/or in the attachments, and of the corresponding application(s), are hereby incorporated by reference.

What is claimed is:

1. A single-step method of converting wet algae biomass to biodiesel comprising:
    reacting the wet algae biomass with a non-catalytic supercritical methanol; and
    the reaction resulting in the biodiesel.

2. The method of claim 1 wherein a drying step is not performed.

3. The method of claim 1 wherein the reacting step is performed at a constant predetermined pressure of about 1000 psi to about 1500 psi.

4. The method of claim 1 wherein the reacting step is performed at a constant predetermined temperature of about 200° C. to about 300° C.

5. The method of claim 1 wherein the wet algae biomass to methanol ratio is about 1:2 to about 1:20 (wt/vol.).

6. The method of claim 1 wherein a separate extraction step is not performed.

7. The method of claim 1 comprising reacting the wet algae biomass with the non-catalytic supercritical methanol in the presence of nitrogen.

8. The method of claim 1 wherein the reaction takes approximately 5 to 45 minutes.

9. The method of claim 1 wherein the reacting step comprises simultaneously extracting and transesterification of the wet algae biomass.

* * * * *